Aug. 3, 1965  W. I. WORKMAN  3,197,811
APPARATUS FOR THE MANUFACTURING OF COMPOSITE ARTICLES
Filed March 1, 1961  10 Sheets-Sheet 1
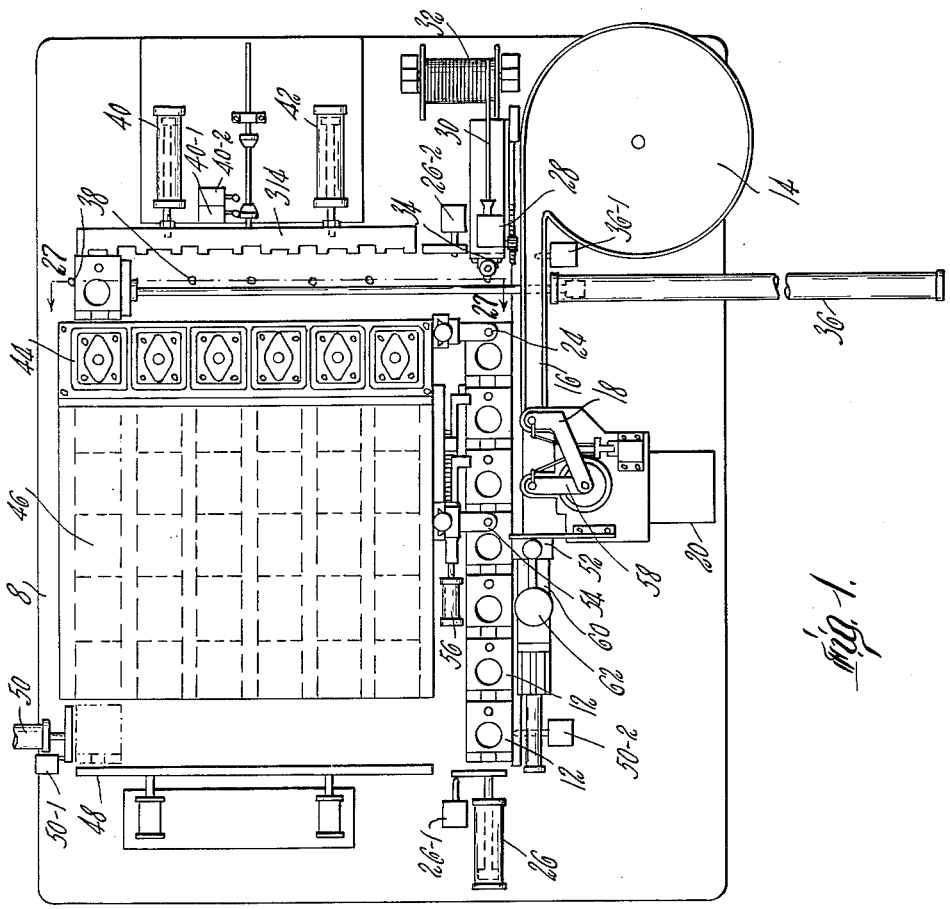
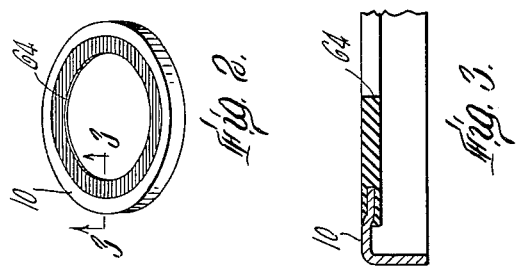

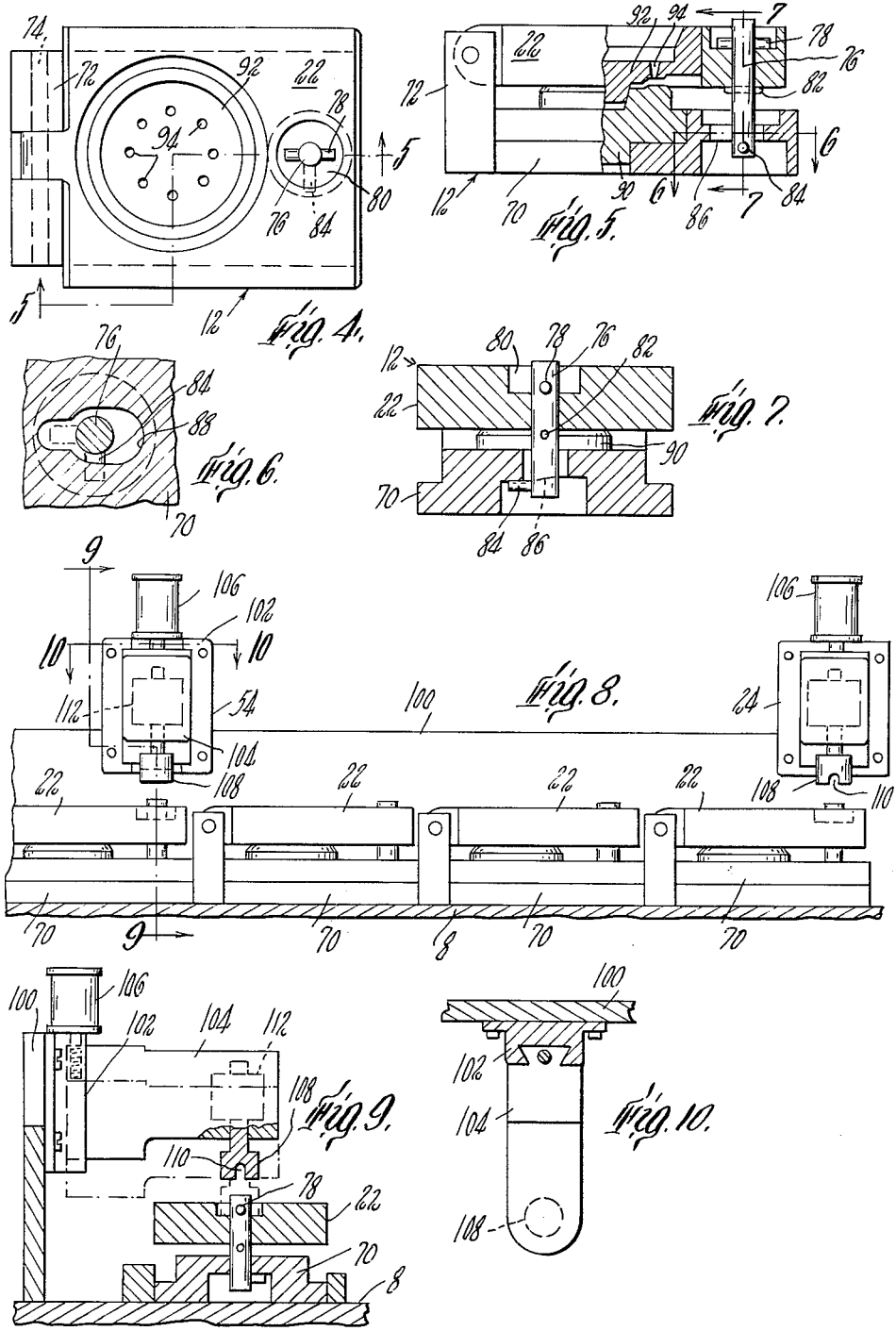

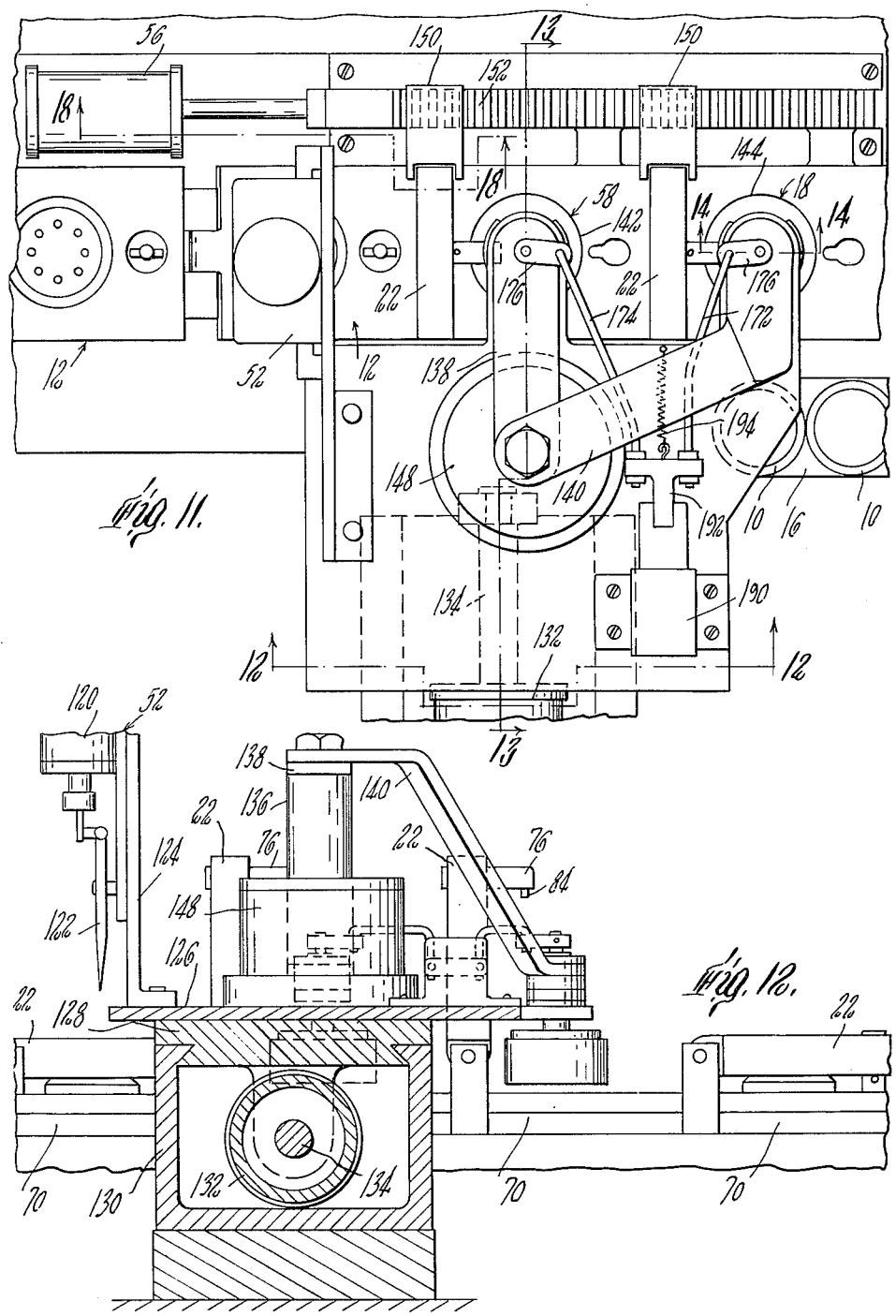

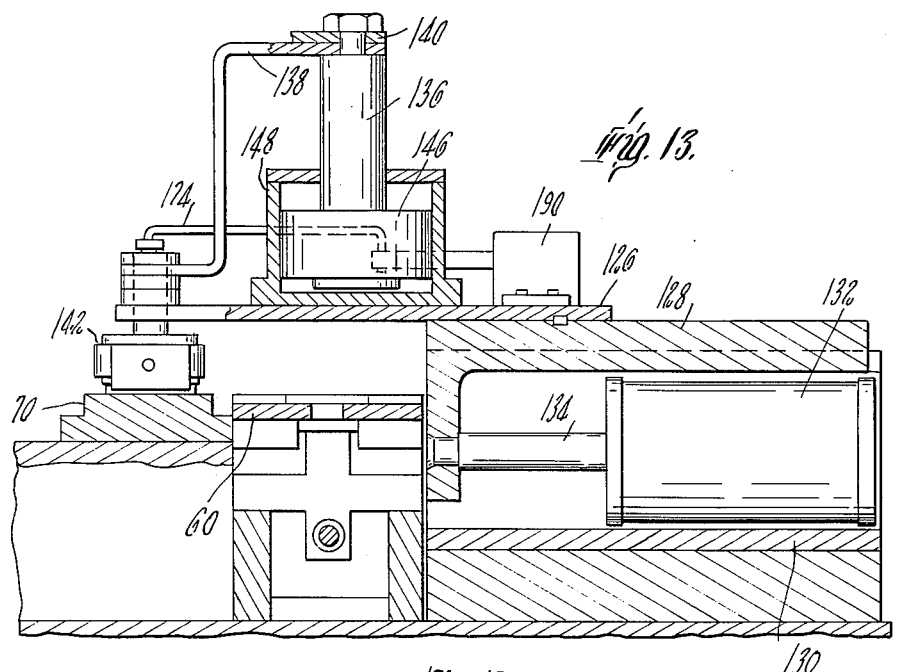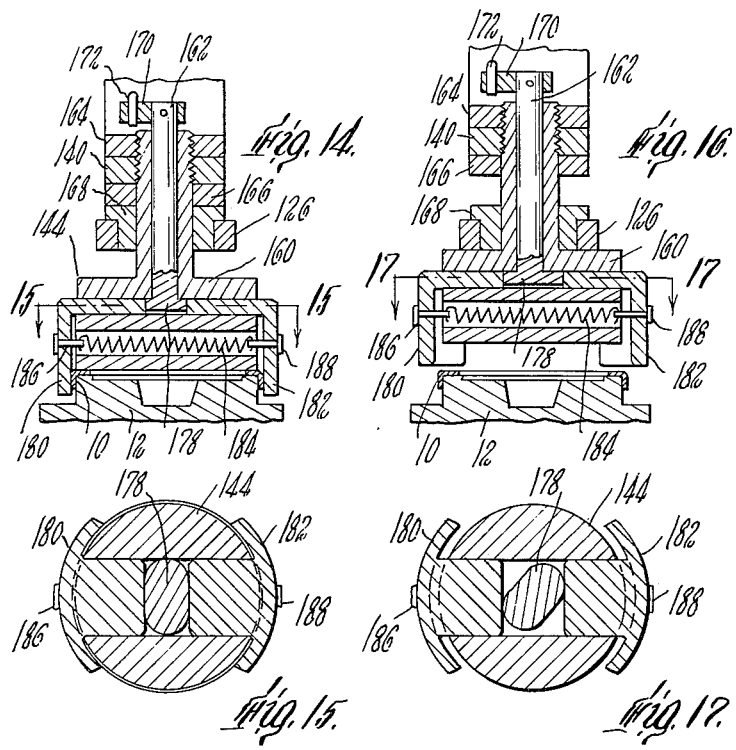

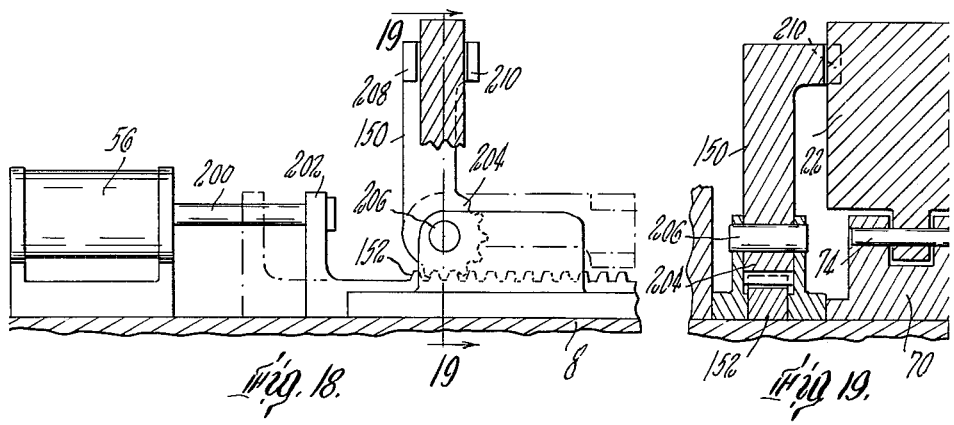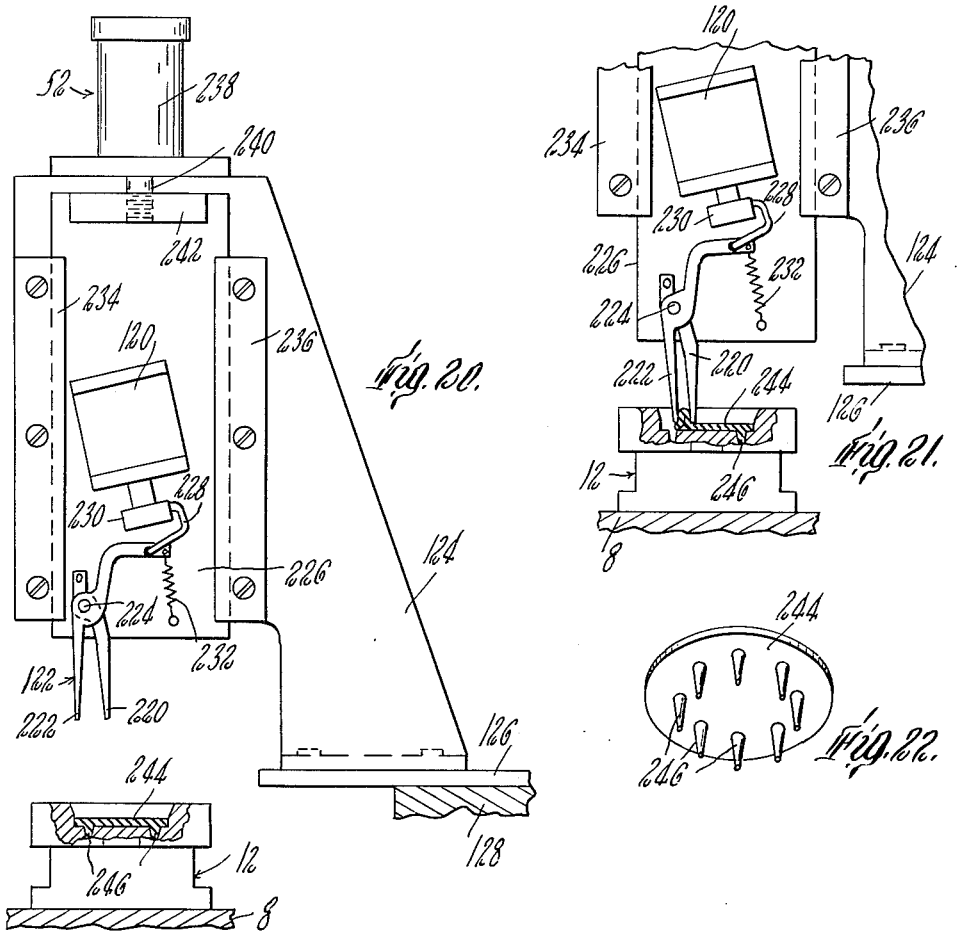

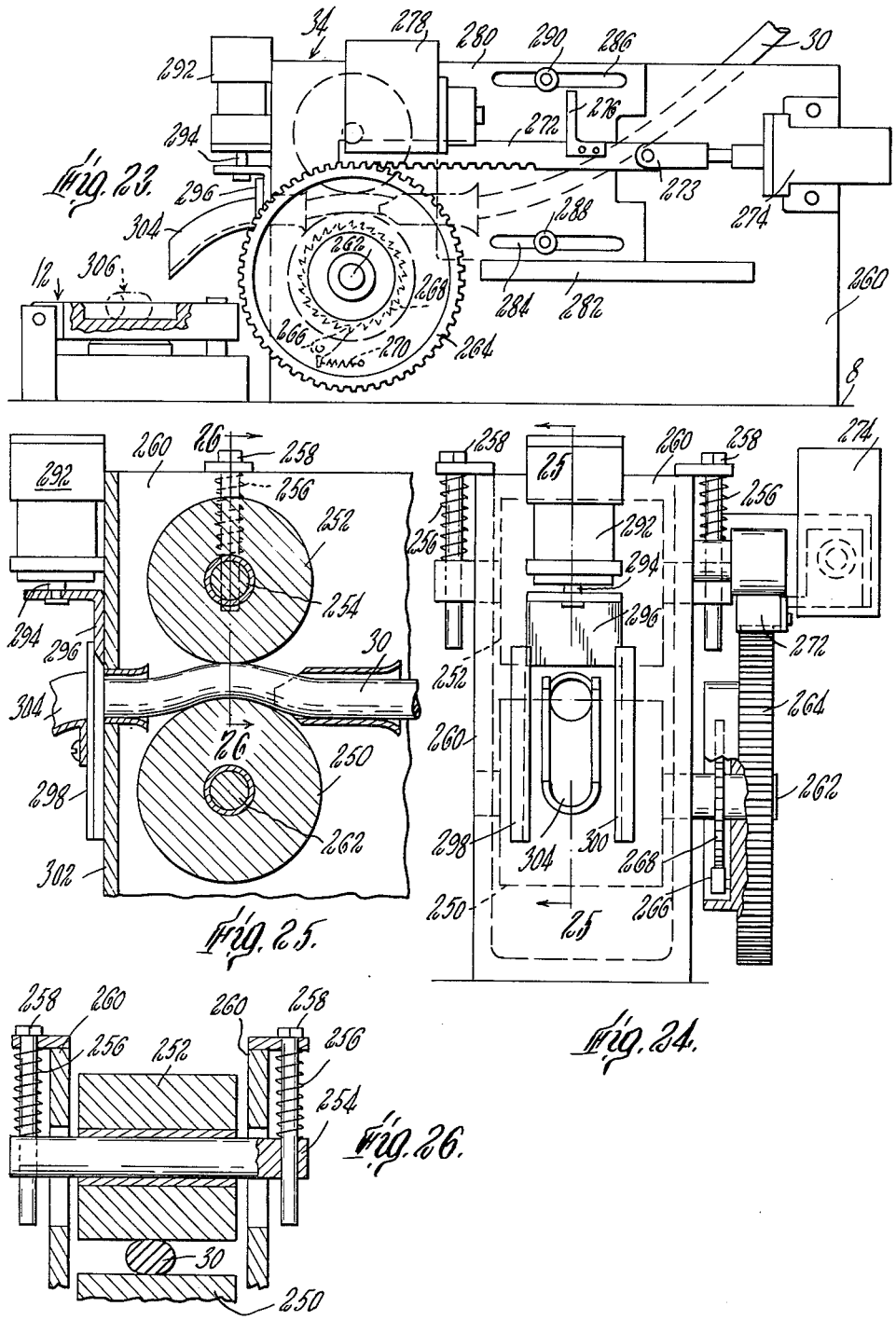

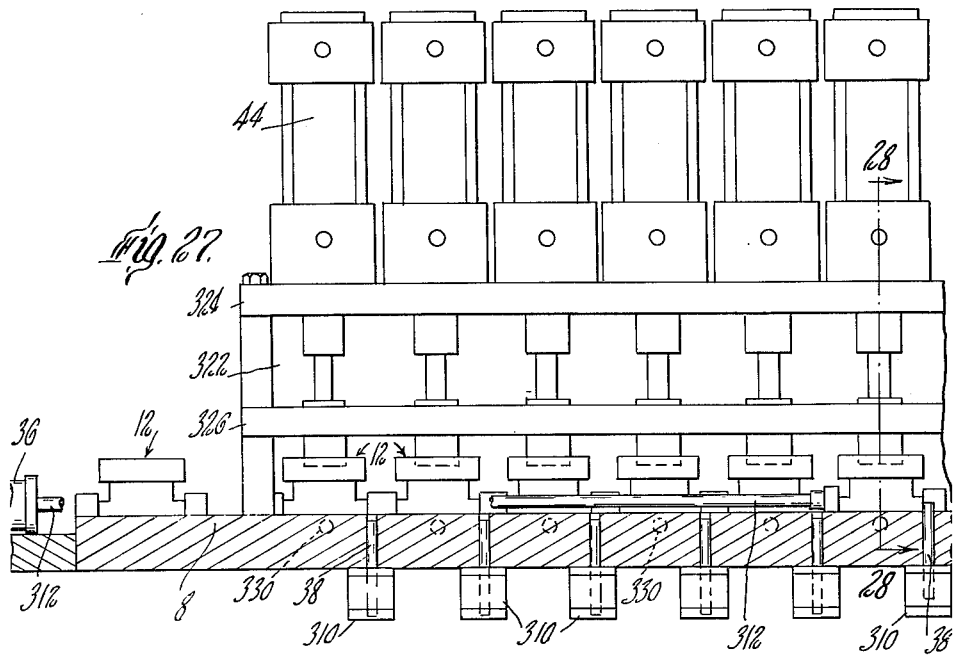
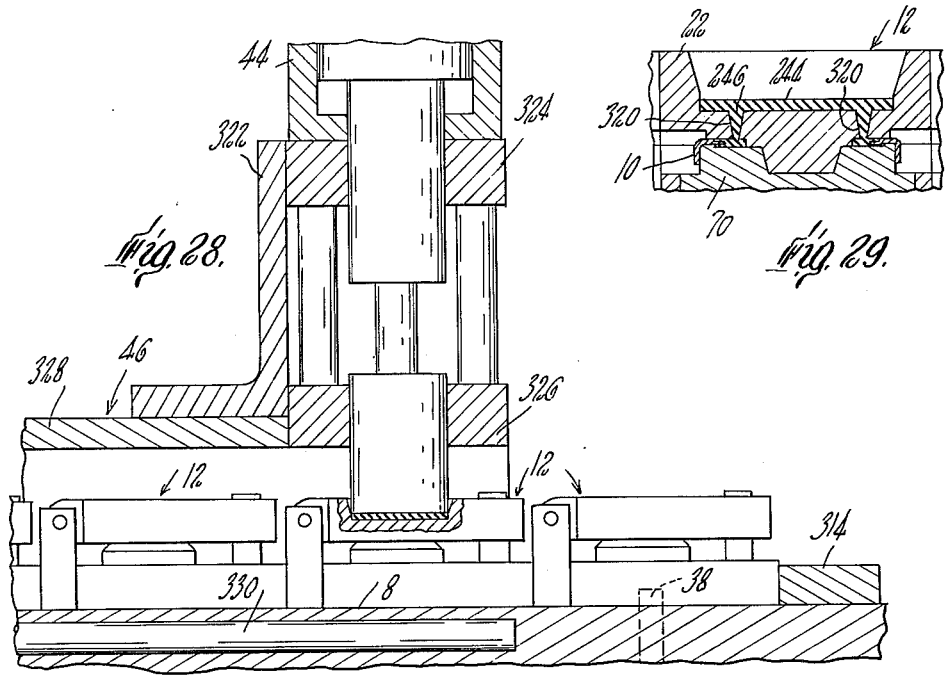

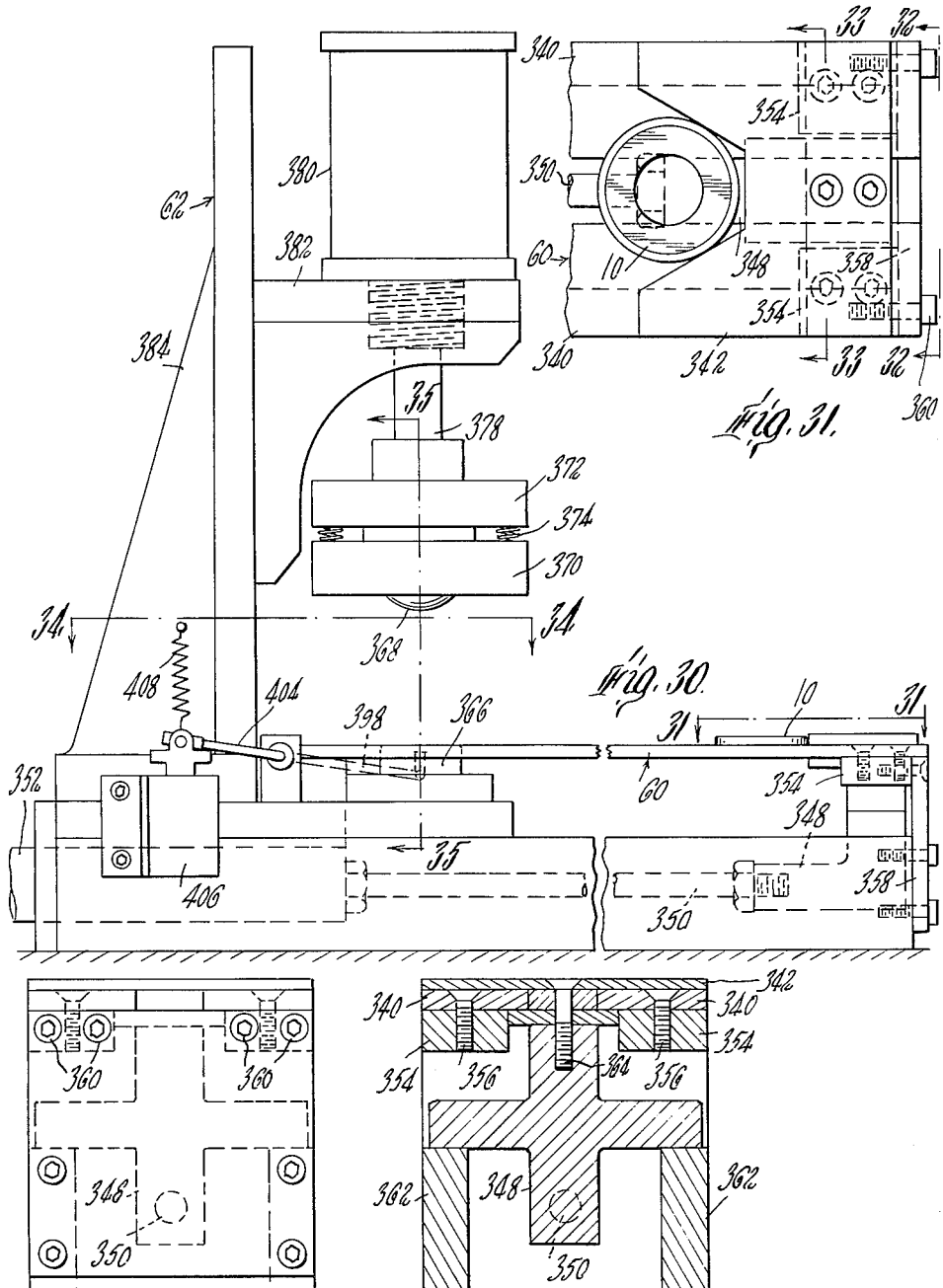

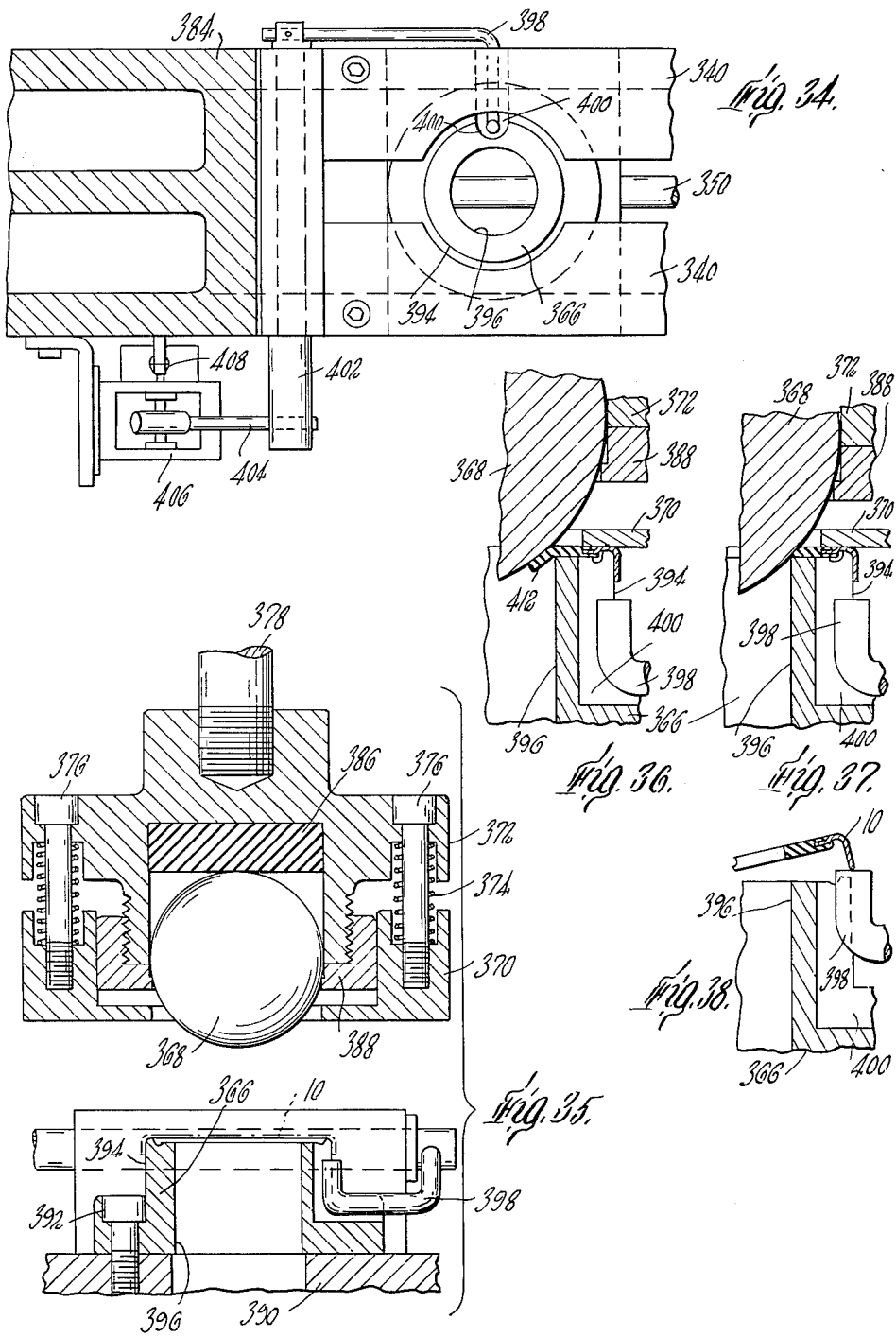

United States Patent Office 3,197,811
Patented Aug. 3, 1965

3,197,811
APPARATUS FOR THE MANUFACTURING OF COMPOSITE ARTICLES
Woodrow I. Workman, Hill, N.H., assignor to International Packings Corporation, Bristol, N.H., a corporation of Massachusetts
Filed Mar. 1, 1961, Ser. No. 92,520
7 Claims. (Cl. 18—4)

This invention relates to apparatus for the manufacture of composite articles and more particularly to improved methods and apparatus which enable the automated manufacture of composite articles such as sealing devices which include a resilient member bonded to a reinforcing member.

In the manufacture of composite articles a resilient member is molded to the desired configuration relative to a reinforcing member in a forming operation and then the formed article is cured in a suitable oven or similar heating device so that the resilient material is firmly bonded to the reinforcing member. The components of the article are conventionally loaded into the mold in proper postion, an operation which can be performed comparatively rapidly, and then are moved to a suitable forming station at which the components in the mold are subjected to high pressure for a substantially longer period of time. The formed article in the mold is then moved to a curing oven and remains there for a still longer interval to accomplish the requisite curing of the resilient material so that an intimate bond between the material and the reinforcing member is achieved. The mold must be then moved to an unloading station in which the formed and cured member is removed, trimmed and/or otherwise handled, as desired. A typical composite article which is manufactured by this process is an annular sealing device consisting of a reinforcing disc member and a rubber or other similar resilient material bonded to its inner or outer periphery. Such seals are inexpensive items which must be manufactured at low cost and in large quantities in order to produce an effectively competitive item. Among the difficulties in achieving apparatus of the desired efficiency are problems of organization due to the differences of intervals required for the several operations, and particularly in view of the length of time required for the curing operation.

Accordingly, it is an object of this invention to provide a novel and improved automatic molding machine apparatus for molding composite articles such as seals in a rapid and efficient manner.

Another object of the invention is to provide a simple, efficient and automatic molding apparatus capable of manufacturing sealing devices by assembling resilient material and a reinforcing disc, forming these materials together in the desired configuration and curing the resultant configuration for the necessary period of time.

Another object of the invention is to provide a novel apparatus for forming composite articles in which the time required for curing the formed articles at elevated temperature is markedly reduced.

Still another object of the invention is to provide an improved apparatus for molding seals and similar composite articles in which the movement of molds between the various operating stations is organized in an interdependent manner so that an efficient, high speed molding operation is achieved.

In accordance with the invention there is provided a heated surface on which the molds utilized for forming the composite articles are moved about. The molds are designed with a substantial surface area which is always maintained in contact with the heated surface so that the minimum temperature of the molds remains at a substantially elevated value throughout the several diverse molding operations. In this manner much of the heat cycling of the molds heretofore necessary when the molds were cooled to ambient temperatures between curing operations is eliminated and molding apparatus of substantially higher over all speed is achieved. In the preferred embodiment of the invention, apparatus for molding sealing devices, automatically controlled and coordinated pistons slide the molds through the several operating stations. These operating stations include a loading station to which reinforcing rims and uncured resilient material are placed in empty molds; a forming station together into the desired configuration under pressure; a curing oven where the formed components are subjected to a curing temperature for the requisite period of time; and an unloading station where the cured article is removed from the mold. The apparatus includes means which simultaneously loads one mold and unloads another. As each forming operation requires approximately six times as long as the loading or unloading operation, six molding stations are provided. Locating apparatus, which is operated in coordination with the forming apparatus, operates to appropriately position each loaded mold relative to a forming cylinder. The mold is slid into forming position and acts to slide the mold just formed into an immediately adjacent curing oven. The principal source of heat within this enclosed oven structure is the heated platen on which the molds are slid about. The molds remain in this oven the necessary length of time, which is an integral multiple of the requisite forming time, and are then automatically slid from the oven and moved to an unloading station where the cured seal is removed and subjected to any further processing that is necessary. Four coordinately operated pusher elements, mounted in insulated relation to the heated platen, as are the loading, unloading and forming mechanisms, provide the impetus for sliding the molds about.

Thus it will be seen that the apparatus of the invention enables an efficient and comparatively high speed molding operation for the molding and curing of composite articles. The several associated manipulating apparatus are arranged so that a rectangular heated surface may be utilized with mold moving elements, appropriately disposed relative to the heated platen for ease of control and actuation in a coordinated manner. Additional features, objects and advantages of the invention will be seen as the following description of a preferred embodiment thereof progresses in conjunction with the drawings, in which:

FIG. 1 is a plan view of the molding apparatus according to the preferred embodiment of the invention;

FIG. 2 is a perspective view of one type of seal that may be manufactured by the molding apparatus shown in FIG. 1;

FIG. 3 is a sectional view taken along the line 3—3 of FIG. 2 of that seal;

FIG. 4 is a plan view of the mold body used in the apparatus of FIG. 1;

FIG. 5 is a side view of the mold body in partial section, the section being taken along the line 5—5 of FIG. 4;

Figure 39:
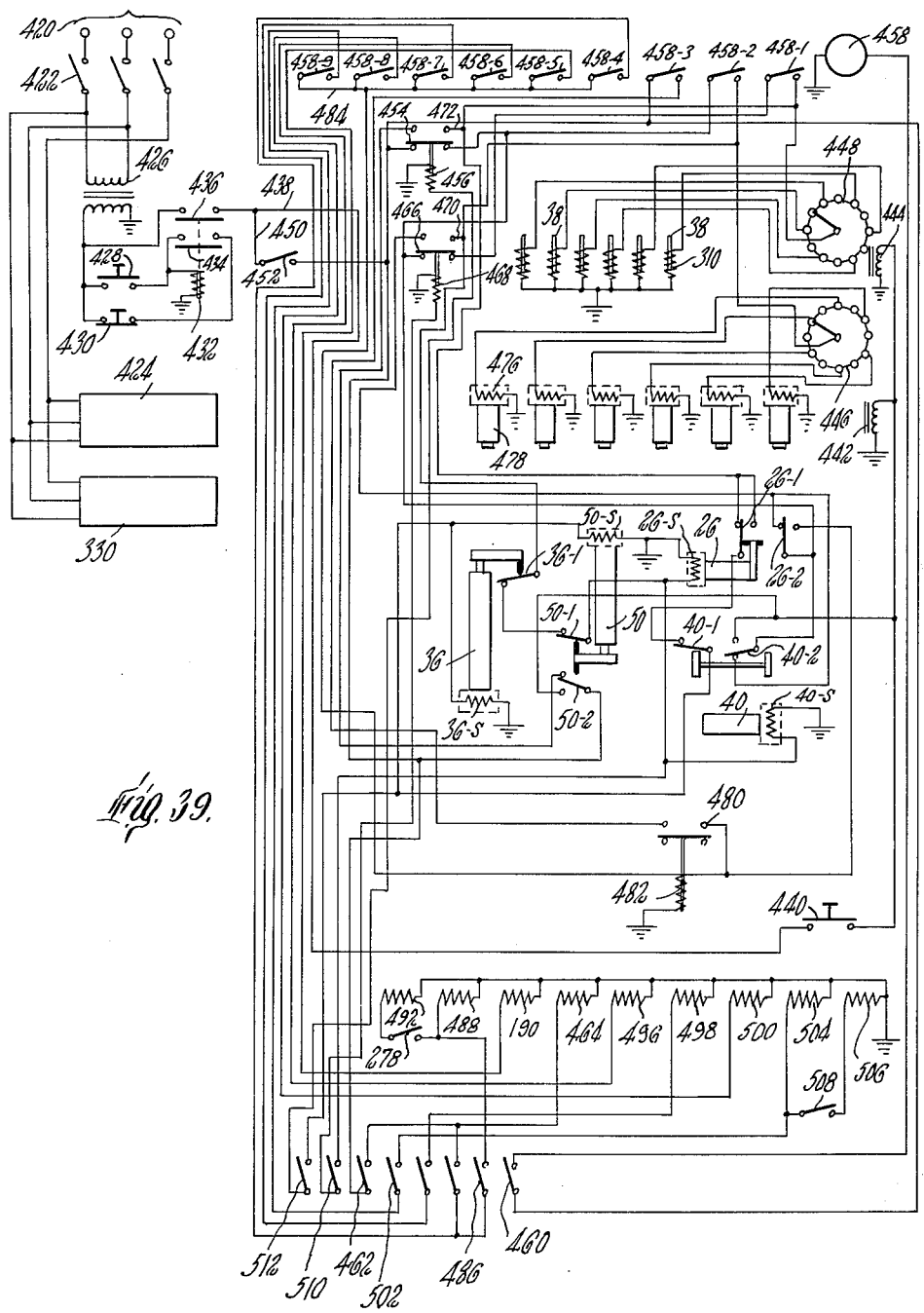

FIGS. 6 and 7 are sectional views of the locking apparatus associated with the mold body taken along the lines 6—6 and 7—7, respectively, of FIG. 5;

FIG. 8 is an elevational view of the unlocking mechanisms associated with the apparatus shown in FIG. 1 which are mounted for positioning over the mold channel adjacent the loading and unloading stations and which operate mold locking mechanisms;

FIGS. 9 and 10 are sectional views of the locking mechanism shown in FIG. 8 taken along the lines 9—9 and 10—10 of FIG. 8 respectively;

FIG. 11 is a plan view of certain mechanisms at the loading and unloading stations of the apparatus shown in FIG. 1;

FIGS. 12 and 13 are sectional views of the mechanisms shown in FIG. 11, the sections being taken along the lines 12—12 and 13—13 of FIG. 11 respectively;

FIG. 14 is a sectional view of the gripping mechanism associated with the seal manipulating mechanism taken along the line 14—14 of FIG. 11;

FIG. 15 is a sectional view of the gripping mechanism taken along the line 15—15 of FIG. 14;

FIG. 16 is a view of the gripping mechanism in a second position;

FIG. 17 is a sectional view of the gripping mechanism in a second position taken along the line 17—17 of FIG. 16;

FIG. 18 is an elevational view, in partial section, of the mold cover manipulating apparatus used with the apparatus of FIG. 1;

FIG. 19 is a sectional view of the mold cover manipulating apparatus taken along the line 19—19 of FIG. 18;

FIG. 20 is an elevational view partially diagrammatic and partially in section of the flash removal apparatus utilized with the apparatus of FIG. 1;

FIG. 21 is an elevational view of a portion of a flash removal apparatus shown in position for removing flash;

FIG. 22 is a perspective view of the removed flash;

FIG. 23 is an elevational view of the mechanism utilized in the apparatus of FIG. 1 for feeding the resilient material into the mold;

FIG. 24 is an end elevational view of the resilient material feeding apparatus;

FIG. 25 is a sectional view of the resilient material feeding apparatus taken along the line 25—25 of FIG. 24;

FIG. 26 is a sectional view of another portion of the resilient material feeding apparatus taken along the line 26—26 of FIG. 25;

FIG. 27 is an end elevational view of the hydraulic press apparatus and heated piston at the molding station of the apparatus of FIG. 1;

FIG. 28 is a sectional view of the hydraulic press apparatus and the curing oven taken along the line 28—28 of FIG. 27;

FIG. 29 is a sectional view through the mold showing the formed seal;

FIG. 30 is an elevational view of the seal trimming apparatus utilized in the apparatus shown in FIG. 1;

FIG. 31 is a top plan view of a portion of the apparatus shown in FIG. 30;

FIGS. 32 and 33 are respectively an end view and a sectional view of the apparatus along the lines 32—32 and 33—33, respectively, as indicated in FIG. 31;

FIGS. 34 and 35 are sectional views through the cutting apparatus along the lines 34—34 and 35—35, respectively, of FIG. 30;

FIGS. 36–38 are a series of diagrammatic views showing the trimming and stripping on the seal by the apparatus shown in FIG. 30; and FIG. 39 is a schematic diagram of the electrical system used to control the apparatus of FIG. 1.

The apparatus shown in FIG. 1 is an automated system for molding seals of the type shown in FIGS. 2 and 3. It will be understood that while a particular type of seal is shown in those figures and will be used in describing the operation of the apparatus that the principles of the invention are not limited to manufacture of that particular type of seal but many other seal configurations and other similar types of articles may be manufactured by the apparatus and methods of the invention. The apparatus shown in FIG. 1 is an electrically and hydraulically controlled system which operates to move molds 12 on a flat heated platen 8 through loading, molding, curing and unloading stations in the manufacture of the seals. Initially formed reinforcing disc members 10 are fed and positioned in molds 12 which are supported on the flat platen surface. The feeding mechanism includes a suitable feeder 14 which feeds the discs 10 into a chute 16 into position adjacent a disc gripping and transferring mechanism 18. This mechanism is reciprocated by hydraulic cylinder 20 and is operated to deposit a disc in the mold positioned immediately in front of it. The cover 22 on the mold is then closed and locked by locking mechanism 24 and the mold is then advanced by hydraulic cylinder 26 to a resilient material feeding station 28. At that station a slug of rubber is cut from a long strand 30 of that material which is stored on a coil 32 by the mechanism 34 and deposited on top of the mold cover in position for molding. The closed mold with the slug of resilient material is then advanced by the cylinder 36 to the suitable position as controlled by contact with a raised pin 38. The feeding mechanism cylinders 40 and 42 are then operated in coordination with the operation of the specific hydraulic cylinder 44 which the mold is in front of to feed the mold beneath that hydraulic cylinder 44. That cylinder is then operated and forces the slug of resilient material into the mold, bonding it to the reinforcing disc positioned in the mold. Each mold is subjected to hydraulic pressure for five times as long as the mold is at either loading station and in this embodiment the time is approximately thirty seconds. After the hydraulic pressure is released the mold is advanced from the molding station beneath the hydraulic molding cylinder into an oven 46 for curing by the feeding of the next mold aligned in that position by a pin 38. The mold boxes thus are stepped through the oven and ultimately emerge and contact the guide plate 48 which acts as a buffer. Each mold is then immediately upon emergence advanced by cylinder 50 into position in front of cylinder 26. The molds in the line that is advanced by cylinder 26 first move to a position to which flash removal apparatus 52 is operated to remove the flash (excess rubber in the mold cover) from the mold. At the next station (unloading), an unlocking mechanism 54 is operated to unlock the mold box and a cover lifting apparatus 56 then operates to rotate the cover upwardly to open the mold box. A seal removing mechanism 58 which moves as a unit with the reinforcing member loading mechanism is advanced to grip the molded seal and remove it from the mold. This removed seal is deposited on a conveyor 60 and is advanced by that conveyor to a trimming apparatus 62 at which the excess material on the inner periphery of the seal is removed in a trimming operation so as to provide a smooth sealing surface 64 as indicated in FIG. 2 to provide adequate sealing characteristics.

It is believed that the following detailed description of various components utilized in this apparatus may be of assistance in more completely understanding the operation of this apparatus. In FIG. 4–7 there are shown several views of the mold 12. This mold is made of suitable heat conductive material and has a base 70 and an upstanding end portion 72 to which the cover 22 is secured for pivotal movement about hinge pin 74. The locking mechanism includes a stud 76 which is positioned for rotatable movement in the end of the cover opposite the hinge 74. This stud 76 carries at its upper end a rod 78 which rides in a depressed portion 80 of the cover surface. Immediately below the cover is positioned a second rod 82 which extends through the stud and acts to position the stud 76 securely in the cover. At the bottom of the locking stud 76 there is provided an extension 84 which extends outwardly and cooperates with a cam surface 86 in the base portion of the mold for positively locking the cover to that base portion. The stud 76 extends through a hole 88 in the base 70 when the cover is in closed position, and in that position it may be rotated so that the stud is positioned either in the dotted (unlocked) position shown in FIG. 6 or in the solid line (locked) position of FIG. 6. It will be noted that the aperture 88 in the base is of a configuration to provide a locking cam surface. Inserts 90, 92 mounted in the base portion and the cover, respectively, define the molded cavity which receives the reinforcing disc and into which the resilient material is forced through the sprue holes 94 in the molding operation.

The locking and unlocking mechanisms 24 and 54 respectively are shown in FIGS. 8–10. It will be noted that there are two mold positions between the locking and unlocking mechanisms. While the molds are in these positions they are being unloaded and loaded. As the locking and unlocking mechanisms are substantially identical it is believed that only the description of one of them will suffice for understanding the operation of the apparatus. These mechanisms are mounted on a suitable support rail 100 adjacent the work and include a slide way 102 and bracket 104 which permits them to be moved in a vertical direction as controlled by cylinders 106. The bracket extends forward over the mold channel and carries a screw driver type of mechanism 108 which has a slot 110 therein for engaging the rod 78 of the mold locking mechanism and rotating it in the desired direction. The drive motor 112 may be a pneumatic motor for example. The motor associated with the unlocking mechanism 54 rotates the shaft in a clockwise direction when viewed as in the plan view of FIG. 10 while the locking motor rotates its screw driver head in the counterclockwise direction.

The flash removing apparatus 52, the completed seal removing apparatus 58, and the reinforcing disc loading apparatus 18 are mounted on a common structure and are reciprocated as a unit. This structure is shown in FIGS. 11–13. The flash removing apparatus includes a cylinder 120 which operates a pair of plier-like members 122 (FIGS. 20, 21). This structure is supported on a bracket 124 which is mounted on base member 126. Additional details of this mechanism and its operation may be had in conjunction with the description of FIGS. 20–22. The seal removing apparatus and reinforcing disc loading apparatus are also mounted on the base plate 126 which in turn is mounted on a plate structure 128 which slides on the ways formed in the upper surface of the chamber 130. Mounted within this chamber 130 is a hydraulic cylinder 132 having a piston rod 134 which reciprocates the base structure 126 toward and away from the mold channel. The loading and unloading apparatus are mounted on a common upstanding cylindrical member 136 and are secured to the top of cylinder 136 by two brackets 138 and 140 which support similar gripping and releasing mechanisms 142, 144 respectively. This cylinder 136 functions as an extension of the piston 146 mounted within cylinder 148 and may be reciprocated upwardly and downwardly to raise and lower the gripping members 142, 144. (When molds are positioned in front of these gripping members the covers are opened by the mechanism which includes levers 150 and rack gear 152, as generally indicated in FIGS. 11 and 13. Additional explanation of this mechanism is provided with the description of FIGS. 18 and 19.)

Details of the gripping mechanism may be seen with reference to FIGS. 14–17. Each gripping mechanism 142, 144 is similar and accordingly only one of them will be described. The gripping mechanism 144 is illustrated and it functions to load reinforcing discs into an empty mold. As indicated in these figures there is a main housing 160 through which extends an operation shaft 162. On the shaft housing portion are stacked, from top to bottom, a nut 164, a spacer 166, the lower end of the bracket 140, and a bushing 168 which is seated in supporting plate 126. When the gripping mechanism is in its lower position as controlled by the operation of piston 146 the spacer 166 is seated on bushing 168 as shown in FIG. 14. Secured to the upper end of the shaft 162 is a radially extending actuating arm 170 to which is secured an operating rod 172. (It will be noted that a corresponding operating rod 174 and operating link 176 are associated with the gripping mechanism 142.) The lower end of the shaft 162 forms a cam portion 178 which acts against two gripping jaws 180, 182 that are pressed inwardly toward one another by a spring 184 that is secured between the jaws by members 186, 188. When the shaft 162 is in the position shown in FIGS. 14 and 15 the gripping jaws 180 and 182 are biased inwardly by the spring 184 so that they grip the disc 10 securely. Rotation of the shaft 162 by means of arm 170 and link 172 moves the cam member 178 so that the jaws 180 and 182 are forced apart releasing the disc 10. It will be noted that the shape of the seal is such that the disc periphery may be initially formed before the resilient material is mounted to it and on the same surface after the resilient material is bonded thereto. Where other types of seal configurations are used the gripping mechanisms may be modified so that proper insertion and removal of the seal members may be accomplished in the practice of the invention. For example in some article configurations it may be desirable to use a magnetic gripping mechanism.

In operation, the gripping elements are initially in the retracted position so that the disc loading element 18 is aligned with the chute 16 which feeds the discs 10. In this position the seal unloading element is carrying a completed seal and is positioned immediately above the conveyor means 60. In this position both elements are lowered as a unit and the solenoid mechanism 190 operates through linkage 192 and against the force of spring 194 to rotate arm 176 in the clockwise direction and arm 170 in the counterclockwise direction, thereby releasing the completed seal from the gripper 142 and picking up a disc 10 from the chute 16 by this gripper 144. The mechanism is then raised by the piston 146 and advanced by piston 132 and its associated rod 134 into position over the open molds after they have advanced one position. The gripper mechanisms are then lowered by piston 146 and the solenoid is deenergized so that the spring 194 causes the arm 176 to rotate in a counterclockwise direction to cause gripper 140 to seize the seal in the mold box positioned immediately beneath it and to rotate the arm 170 in a clockwise direction to deposit the disc carried by gripper 144 in proper position in the mold box 12. Thus a simultaneous loading and unloading operation is accomplished by this mechanism.

The cover operating mechanism is shown in FIGS. 18 and 19. In those figures there is shown the operating cylinder 56 which has its piston rod 200 secured to an upstanding bracket member 202 which forms a portion of the rack gear 152. Two cover engaging members 150 (only one of which is shown in FIG. 18) have cooperating gear portions 204 which are mounted on shafts 206 such that reciprocation of the rack gear 152 rotates the cover engaging members 150. In FIGS. 18 and 19 the cover 22 is shown open with the slotted end of the operating engaging member 150 defined by two opposed arms 208, 210 which engage either side of the cover to hold it in vertical position. In operation the engaging member 150 is in horizontal position with the rack gear withdrawn to the dotted line position indicated in FIG. 18 during the interval that the molds are being moved. When they are positioned at the unloading and loading stations the cylinder 56 is operated to move the rack gear forward through rod 200 and to rotate the members 150 in a counterclockwise direction to open the mold covers, thus pivoting them 90°. Before the molds are moved again the covers are closed by moving the rack towards the right as viewed in FIG. 18 in which position the members 150 return to the horizontal position and permit the edges of the covers to slide through the slots provided between the arms 208, 210. Thus it will be seen that there is provided a simple mechanism for opening and closing the mold covers in coordination with the movement of the molds past the loading and unloading stations.

The flash removing apparatus 52 is shown in FIGS. 20 and 21. As indicated in those figures the apparatus includes a pair of plier-like elements 122 which include fingers 220 and 222 which are pivotally secured together by pin 224. Finger 220 is secured at its upper end to a main supporting framework 226. The other finger 222 is connected by a linkage 228 to an operating arm 230 of solenoid 120. Spring 232 biases the plier elements 220 and 222 to an open position. The solenoid and plier structure is mounted on the support 226 which is moved within guides 234, 236 by the operation of cylinder 238 and its associated piston rod 240 which is connected to block 242 that is secured by conventional means to the base member 226. This entire structure is supported on bracket 124 which is secured by conventional means to the base member 126. The flash remover is positioned at one mold distance before the seal unloading station.

As will be recalled, the base member 126 slides with the member 128 as a unit with the gripping mechanisms 18 and 58. When the flash remover is in its forward position the plier elements are positioned immediately over the mold box at that flash removing station as shown in FIG. 20. The cylinder 238 is then operated to lower the plier elements and assembly on the base 226 to the position shown in FIG. 21. In that position the solenoid 120 is energized to operate the pliers via the connecting linkage 28 so that they grip the flash 244 as shown in FIG. 22 and break the sprue portions 246 from the main seal. With the pliers still gripping the flash the cylinder 238 is operated to raise the pliers and the entire flash is pulled entirely free of the seal that is within the mold box in a simple operation.

The resilient material feeding and cutting apparatus is shown in FIGS. 23-26. As above explained, that apparatus 34 feeds a predetermined length of rubber or similar resilient material 30 suitable for use in the seal and then cuts that slug so that it is deposited in the mold at that station. This mechanism includes two wheels 250, 252 which are disposed on either side of the strip of rubber 30, and frictionally grip the material so that they feed that material when they are rotated. As shown in these figures, roll 250 is driven and roll 252 is mounted on shaft 254 which is biased downwardly by springs 256 mounted on guide members 258 which are positioned to the outside of framework members 260. The drive roll 250 is fixedly mounted on shaft 262. A gear member 264 is mounted for rotation on the shaft 262 and member 266 is carried by the gear. This cam is biased into engagement with a ratchet wheel 268 by a spring 270. This ratchet wheel 268 is fixedly attached to the shaft 262 and as the gear 264 rotates in one direction (counter-clockwise as shown in FIG. 23) the cam 256 engages the ratchet wheel and drives the roll 250 in the same direction. However, when the gear 264 is driven in the opposite direction the cam overrides the ratchet teeth and does not drive the roll 250. The gear 264 is driven by a rack gear 272 that is supported at one end by the gear 264 and is pivotally connected at its opposite end by a yoke 273 to an operating cylinder 274. An upstanding arm 276 mounted on the rack gear structure 272 cooperates with a switch 278 to control the amount of roll rotation and thus the feeding of the resilient material during each operation. This switch 278 is mounted on a plate 280 which is adjustably positioned relative to the supporting wall 260 and slides on bar 282. Slots 284, 286 in the support plate 280 permit its adjustment and it is locked in place by bolts 288, 290. Thus the electrically controlled cylinder mechanism 274 operates to move the rack gear 272 to the left as shown in FIG. 23 and this movement drives the gear 264 so that the ratchet wheel rotates the driving roll 250 to advance the resilient material 30. This advance continues until the arm 276 contacts the switch 278. When the material has been advanced the desired distance a cut off mechanism operates.

This cut off mechanism includes a cylinder 292 and a piston rod 294 which is connected to a knife structure 296. The position of this knife structure is restrained by guide members 298, 300 mounted on the face plate 302 of the feeding mechanism. After the material 30 has been advanced the desired distance and is suported in the chute 304 (which is also supported on the guide members 298, 300) the cylinder 292 is actuated to force the knife 296 down through the resilient material severing a slug of it and that slug 306 slides down the chute 304 to be deposited in the depressed portion of the cover of the mold 12 as shown in FIG. 23. The advance of the molds through the loading and unloading stations has been under the step by step control of cylinder 26. The cylinder 36, which is a telescoping four section cylinder, is now actuated to move the loaded mold down the molding channel to the location specified by the pin 38 which is raised. The cylinders 40, 42 are actuated, after the mold has been appropriately located, the pin dropped and a corresponding molding cylinder 44 raised, to move that mold into position under that cylinder for the molding operation. (Simultaneously a mold carrying a cured seal is slid out of the oven into the channel in front of cylinder 50.)

An end view of the apparatus showing the molding cylinders 44 is shown in FIG. 27. Each mold is advanced by the cylinder 36 from the resilient material loading station to a position in front of a selected molding press cylinder as determined by the positions of the pins 38 which are controlled by solenoids 310. One of these pins 38 is raised when the cylinder 36 is operated to slide the mold to the right in FIG. 27 as far as it is able to as controlled by the position of that pin. As indicated in FIG. 27 the rightmost solenoid 310 is energized and its pin 38 is raised so that the piston rod 312 of the cylinder 36 slides the mold across the heated platen 8 into contact with that pin. The control circuitry then retracts the piston rod 312, deenergizes the pin solenoid 310 and energizes the Vickers valve solenoid associated with the corresponding molding cylinder 44 to raise its ram. Mold advancing plate 314 shown in FIG. 28 is then advanced by cylinder 40 and 42 to feed the mold into position under the corresponding hydraulic cylinder. This cylinder is then actuated (by deenergizing its solenoid) to drive its associated molding plunger organ into the cover depression in the mold. The next pin 38 is then raised by its associated solenoid 310 so that the next mold will be properly positioned in front of its hydraulic mold cylinder and the cycle is repeated. When this cylinder 44 is actuated its ram forces the resilient material through the sprue holes 320 and into the space provided within the mold for forming the rubber relative to the reinforcing disc 10 such that the desired seal configuration as determined by the mold, is achieved. The resulting seal configuration is shown in FIG. 29. The support for the hydraulic cylinders shown in FIGS. 27 and 28 include a bracket 322 which holds one of the piston heads 324 and a molding ram guide 326. This support bracket 322 is mounted on the roof member 328 of the oven 46.

As mentioned above, conventional electrical heating elements 330 are mounted below the platen 8 and provide the heat for the the requisite curing of the seal after it has been molded. The ambient temperature within the oven is higher than other platen areas due to the controlling effect of the over roof 328. However, as the molds remain in contact with the piston and are slid about thereon, there is only a small change in temperature during the loading and unloading operation and the curing process is enabled to be completed much more rapidly than in apparatus heretofore which involved substantial heat cycling of the molds. After the requisite duration of the hydraulic pressure to perform the molding operation has been completed the molding ram is withdrawn and advancing bar 314 is actuated by cylinders 40 and 42 to move another mold under the hydraulic cylinder and at the same time slide the mold into the oven for the curing operation. The duration of the curing operation is an even multiple of the molding time, and in the illustrated embodiment is two and one-half minutes.

After the mold emerges from the oven it is slid, by cylinder 50, which is also a four section telescoping cylinder similar to cylinder 36, to the end of that channel in front of cylinder 26 for step by step advance to the flash removing, unloading, and loading stations, to repeat the cycle.

After the seal is removed at the unloading station, it is trimmed. The trimming apparatus is shown in FIGS. 30–38. Included in this apparatus is a conveyor 60 on which the completed seals are deposited by the unloading apparatus 58. The conveyor apparatus includes a set of ways 340 on which the seal is deposited. Mounted on the ways is a guide 342 which includes two outwardly extending surfaces that embrace the seal. The guide is secured, centrally of the ways, to a bracket member 348 which in turn is secured by means of shaft 350 to an operating cylinder 352. After the seal is deposited by the unloading apparatus on the ways the cylinder 352 is operated to move the bracket 348 to the left, moving the seal from its position at the unloading station to the trimming station. An end view and a cross sectional view of the conveyor 60 including bracket 348 are shown in FIGS. 32 and 33, respectively. As indicated in those views the ways 340 are secured to blocks 354 by screws 356 and these blocks in turn are secured to end plate 358 by other fastening means 360. The drive bracket 348 has outwardly extending flanges which are supported on side walls 362 and guide the reciprocating movement. The seal moving guide 342 is secured to the bracket 348 by screws 364.

When the seal has been moved to trimming station it is deposited on an upstanding cylindrical support member 366 so that the reinforcing disc rests on a wall thereof. Disposed immediately above this support is the trimming apparatus which includes a ball 368 generally supported in blocks 370, 372 which are spaced by resilient means 374 and secured together by bolts 376 as shown in FIG. 35. This structure is supported by a rod 378 which is disposed for reciprocating movement and is moved by a cylinder 380. The cylinder is supported on arm 382 extending from bracket member 384 which is suitably mounted on the base of the apparatus. As shown in FIG. 35 the ball 368 is held against a resilient member 386 within the disc member 372 by a head member 388 which is threadedly secured to block 372. The lower block 370 is designed to fit closely about the locking head 388 and slides relative thereto. The locking head 388 and the disc 370 are normally held in spaced relationship by the springs 374.

Details of the seal support may be seen in FIGS. 31, 34 and 35. This support includes a cylindrical member 366 which is secured to a base 390 by bolts 392 and is designed to provide an upstanding flat surface for supporting the seal. Its outside surface 394 is adapted to receive the depending lip of the reinforcing disc 10 and its inside surface 396 which is concentric therewith serves as a guide for establishing the desired inner diameter of the resilient portion of the seal. A stripping apparatus is associated with this support and includes a rod 398 which is positioned within a relieved or groove portion 400 in the outer surface 394 of the support 366. This groove 400 is dimensioned such that the rod 398 may extend in a position immediately underneath the depending edge of the reinforcing disc 10. The stripper rod 398 is connected via shaft 402 and an actuating link 404 to a solenoid 406. This rod and stripping structure is normally biased into its inoperative position by spring 408.

In operation the unloaded seal is moved by the conveyor into the trimming station and positioned on the support 366. The cylinder 380 is then operated to move the trimming structure ball downwardly so that the ball 368 contacts the resilient member as shown in FIG. 36 and acts against the sharp edge defined by the inner surface 396 of the support structure 366. The removal of the excess resilient material 412 is shown in FIGS. 36 and 37. In the position shown in FIG. 37 the surface of the block 370 contacts the seal holding it down and continues to contact the seal as the ball is withdrawn by the cylinder 380 so that the trimming mechanism will rise freely of the trimmed seal. After the trimming ball has been withdrawn the stripper mechanism is up energized to move the stripper bar 398 upwardly as indicated in FIG. 37 to lift the trim seal from the support structure 366.

A schematic circuit of the electrical control system for the apparatus is shown in FIG. 39. Three phase electrical power is supplied to this circuitry by lines 420 through a suitable line switch 422 to the heaters 330 and to the hydraulic pumps 424. Single phase power is derived through transformer 426 for operating the control circuitry. Incorporated in this circuitry is a start push button 428 and a stop push button 430. When the start push button 428 is depressed, the solenoid coil 432 is energized to close contacts 434 and 436. The contacts 434 complete a holding circuit in series with the stop push button 430 that holds the coil 432 energized. The contacts 436 complete the circuit to supply the control circuitry with single phase electrical power. This power is applied through a line 438 to a sequential advancing switch 440 which supplies power to the advancing coils 442 and 444 of the sequencing switches 446 and 448 respectively. This circuit enables the sequencing switches to be advanced in a manual operation. Power is also supplied to line 450 which is connected to switch 452 and supplies power to the control circuitry for the automatic operation of the system. The switch 452 is connected to the normally closed contacts 454 of relay 456; to the contact 458-3 that is operated by the timer motor 458; to timer control switch 460 which controls the application of power to the timer motor 458; to contacts 50-2 (associated with the control of cylinder 50); and to control switch 462 (which is connected to the mold opener coil 464).

Power is supplied through the normally closed contacts 454 of relay 456 to contact 458-2; to the normally closed contacts 466 of relay 468; to microswitch contact 26-2 (associated with cylinder 26); and to microswitch contact 40-2 (associated with cylinder 40). When switch contact 458-2 is closed and relay 456 is deenergized, power is supplied to the stepping switch 466; to the normally open contacts 470 of relay 468; and to microswitch contacts 36-1 (associated with the cylinder 36). When relays 456 and 468 are deenergized power is supplied to contacts 458-1. When power is supplied to stepping switch 448 (via contact 458-1) and one of its cooperating contact elements is connected the corresponding pin solenoid 310 is energized to raise a pin 38. When power is supplied to stepping switch 446 (via contact 458-2) and a contact is connected, a corresponding control solenoid 476 associated with the hydraulic valve 478 which raises the hydraulic ram is energized. It will be noted that the connected contacts of switch 446 are arranged to be energized alternately with those of stepping switch 448 and it will be thus seen that the pins 38 and hydraulic rams are alternately energized. The stepping switches 446 and 448 are stepped twice during each operating cycle of the control circuitry.

Power is supplied through timer switch contact 458-3 when it is closed to the normally open contacts 480 of relay 482. This contact, when closed, supplies power to the bus 484 associated with timer switch contacts 458-4 through 458-9. A circuit for initially energizing this relay 482 is provided through microswitch contacts 26-2. Thus when contacts 26-2 are actuated (when the piston rod of cylinder 26 has been fully extended) power is supplied from the normally closed contacts of relay 456 to the coil 482 to close the contacts 480 thus completing a circuit through contact 458-3 to the common line 484 so that the contacts 458-4 through 458-9 as operated apply power to perform various loading control operations.

Contact 458-4 when closed applies power through switch 486 to the stock feed control coil 488 and through the switch 278 to the stock cut off control coil 492. Timer switch 458-5 when closed applies power to the gripper control solenoid 190. Timer switch 458-6 applies power to the up-down control solenoid coil 496 of the seal loading mechanism. Timer switch 458-7 applies power to the in-out control solenoid coil 498 and the extraction mechanism and timer switch 458-8 applies power to the flash removing solenoid coil 500. Timer switch 458-9 applies power through switch 502 to the trimmer solenoid coil 504 and to the ejection solenoid coil 506 through switch 508.

The following table indicates the correspondence between various operating mechanisms and the electrical control coils which actuate them.

| Mechanism: | Control coils |
|---|---|
| 26 | 26-S |
| 36 | 36-S |
| 38 | 310 |
| 40 (42) | 40-S |
| 44 | 476 |
| 50 | 50-S |
| 56 | 464 |
| 132 | 494 |
| 148 | 496 |
| 190 | 190 |
| 238 | 500 |
| 274 | 488 |
| 292 | 492 |
| 380 | 504 |

Thus timer contact 458-1 controls the application of power through the stepping switch 448 to the pin solenoids 310; contacts 458-2 control the application of power through stepping switch 446 to a connected Vickers valve solenoid 476; contacts 458-3 control the application of power to the main bus for executing the various operations performed at the loading and unloading stations; and contacts 458-4 through 458-9 control individual ones of those operations. Holding circuits are provided to maintain power to the pin solenoids 310 and molding cylinder solenoids 476 via relays 452 and 468 respectively after the timer contacts 458-2 and 458-1 have opened to coordinate that application of power with the operation of mold sliding cylinders 26, 36, 40 and 50. It will be recalled that power is supplied to timer contacts 458-3, to timer motor switch 460, to contacts 50-2 and to mold opener switch 462 at all times.

As mentioned above, mold sliding cylinders 36 and 50 are four section telescoping cylinders which move mold boxes into position before the molding station and out of position from the end of the oven respectively. These two cylinders are operated at the same time. Cylinders 26 and 40 (and 42 which is operated at the same time as 40 but not shown on this schedule) are stepping cylinders which advance the mold box through the loading stations and into the molding stations respectively. Associated with each of these cylinders are one or two microswitches. The switches designated -1 are operated when the cylinder is retracted and the switches designated -2 are operated when the cylinder is extended. In the schematic the switches are shown in the position that they assume when the cylinders have been retracted. Those cylinders are operated by solenoids designated by the associated cylinder reference numeral and the letter S.

The set of switches in the lower portion of FIG. 39, comprising switches 512, 510, 502, 486 and 460, are auxiliary control switches which are normally closed during the operation of the machine.

It is believed that the operation of the equipment may best be understood by a step by step explanation of the operation of one cycle. Assume that initially both relays 456 and 468 are deenergized and that only timer contact 458-1 is closed. Electric current is supplied through closed contacts 456 and 458-1 to the pin solenoid stepping switch 448 and through contacts 26-1 and 40-1 to operate the solenoids 50-S and 36-S and to energize relay 456, opening contacts 454 and closing contacts 472. Power is applied through the normally closed contacts 50-2 to the closed contacts 472 to maintain power to the stepping switch 448 even though timer contact 458-1 may open and also to the circuit through contacts 26-1 and 40-1 so that the solenoids 36-S and 50-S and relay 456 remain energized. When the cylinder 50 actuates contact 50-2 at the end of its travel the holding circuit is opened removing power from relay contacts 472 and power is applied to the solenoids 442 and 444 to advance them one position. On the removal of the power from their solenoids the cylinders 36 and 50 retract. It will be recalled that these are the telescoping cylinders and that by this operation a loaded mold is appropriately positioned in front of a molding cylinder 44, and a cured mold is moved in front of cylinder 26.

Upon closing of timer contact 458-2 and the de-energizing of relay 456 power is applied through contacts 454 of relay 456 and timer contacts 458-2 to the stepping switch 446 which applies power to a connected hydraulic ram solenoid 476. Power is also supplied through contacts 36-1 and 50-1, connected in series, to energize the solenoids 26-S and 40-S and the relay 468, opening contacts 466 and closing contacts 470. The closing of contacts 470 provides a maintaining circuit for the power to the stepping switch 446 and also maintains the solenoids 26-S and 40-S energized until both contacts 26-2 and 40-2 are operated when a mold driven by their respective associated cylinder rams contact them. Upon operation of micro switch 40-2 power is also applied to the stepping switch solenoids 442 and 444 to step them. In addition when micro switch 26-2 is operated a circuit is completed to operate relay 482 and energize the bus 484 associated with the contacts 458-4 through 9. The closing of contacts 480 associated with 482 completes a holding circuit which maintains the bus energized from timer contact 458-3. With the timer bus 484 energized, closing of contacts 458-4 operates the stock feed coil and via the associated switch 278 and the stock cut-off coil 492. Also this contact operates the mold opener coil 464.

In similar manner, at the flash removal and loading and unloading stations, the control coils are operated in this following order: the in-out coil 498 is energized to move the apparatus in; the up-down coil 496 is operated to lower the apparatus and at the same time the flash-removing jaws are moved down. The flash removing pliers operate to grasp the flash; the gripper jaws operate to deposit a disc in the empty mold and to remove the finished seal from the adjacent mold. The apparatus then raises the jaws and pliers, slides out and moves down. The jaws operate to release the completed seal and to pick up another disc, and the removed flash is released. The gripper jaws are then moved up in preparation for another loading-unloading cycle. During this cycle the mold unlocking and locking screw drivers are also operated (at their respective stations). This loading and unloading cycle starts when the cylinder 26 is fully extended (on the operation of contacts 26-2) and may continue into the cycle time when the cylinders 36 and 50 are operating, but must be completed before the cylinders 26 and 40 are ready to be extended again. Before they can operate, the loading-unloading cycle must be complete and the molds closed.

Thus it will be seen that the apparatus of the invention provides an integrated molding machine apparatus for molding seals in a rapid automatic manner. The molds are moved in a coordinated manner through several stages which required different times to complete. By suitable organization of the equipment the molds themselves cause the advance as required. In addition the molds are slid about in contact with a heated surface, so that they maintain a high temperature and the heat necessary to cure, and the time required is substantially reduced. As pointed out above, the seals may take various configurations and the apparatus may be modified in order to accommodate the seals of those different configurations. Also other articles of similar composite structure may be molded with this apparatus. In addition, of course, the control circuitry may be modified in various ways, which will be obvious to those having ordinary skill in this art, both to accommodate different types of control equipment and also to perform certain different cycles of operation. Therefore, while a preferred embodiment of the invention has been shown and described, it is not intended that the invention be limited thereto or to details thereof, and departures may be made therefrom within the spirit and scope of the invention as defined in the claims.

I claim:

1. Apparatus for molding articles which comprises a base housing a heated flat surface, a plurality of molds positioned on said surface, mold loading and unloading devices located respectively at mold loading and unloading stations disposed adjacent one side of said surface, and molded article forming devices at a plurality of forming stations disposed along a second adjacent side of said surface, the central portions of said heated flat surface providing a molded article curing station, means adjacent said surface defining a closed path system along said surface for said molds including a single path adjacent said side of said surface adjacent said mold loading and unloading stations, and a plurality of paths, one passing through each of said molded article forming stations passing across the central portion of said flat surface through said curing station, and means imparting stepped increments of movement to said molds along said first path to position a following mold at each of said unloading and loading stations, and successively along different ones of said plurality of paths around said closed path system for positioning molds successively at said article forming stations whereby said molds are moved through said unloading and loading stations along said single path at a rate higher than their rate of movement through said article forming stations along each of said plurality of paths by a factor equal to the number of said plurality of paths.

2. Apparatus operative in accordance with a recurring cycle of operations for molding articles which comprises a support formed with a flat surface having rectangularly arranged sides, mold unloading and loading devices located respectively at mold unloading and loading stations disposed along a first path adjacent one side of said surface, and pressure applying molded article forming devices at a plurality of forming stations disposed adjacent a second path along a second adjacent side of said surface, the central portions of said flat surface providing a molded article curing station, a plurality of molds positioned on said surface including a group of said molds movable serially along said first path through said loading and unloading stations adjacent said first side of said surface, and additional series of molds disposed along a plurality of third paths parallel to said first path and passing through said respective molded article forming stations across the central portion of said flat surface through said curing station, means adjacent said surface defining a closed path system for the movement of said molds in succession through the several stations comprising means imparting stepped increments of movement to said molds along said first path to position a next succeeding mold at each said unloading and loading stations, means moving a loaded mold from said first path opposite a serially selected article forming station at the end of a said parallel path, means step moving said loaded mold into said selected article forming station and simultaneously displacing a cured article containing mold from the opposite end of said parallel path through said curing station, means returning said displaced mold in a fourth path along a fourth side of said surface to said first path, and coordinate control means for actuating each of said loading and unloading devices, for actuating a selected one of said molded article forming devices to release the pressure upon an about-to-be displaced formed article containing mold and to apply pressure to the loaded mold moved into said selected article forming stations, and for actuating each of said mold moving means in a recurring cycle of operations.

3. Apparatus for molding articles according to claim 2 in which said means for effecting a stepped advance comprises a first pusher device for advancing said molds serially the length of one mold only in said first path, a second pusher device for advancing one mold to a selected curing station position in said second path, a third pusher device for advancing said positioned mold in a said diverse third path to said forming station, and for advancing any serially preceding molds displaced by the advance of said mold to the forming station serially the length of one mold along said diverse third path through the curing station the length of one mold, and for projecting a leading one of said molds into said fourth path, and a fourth pusher device for advancing a mold in said fourth path into said first path.

4. Apparatus for molding articles according to claim 2, said articles having base and molded plastic components in which said mold unloading and mold loading devices include a slide shiftable transversely of said first mentioned side of said flat surface between advanced and retracted positions, an article unloading gripper and a base component loading gripper mounted on said slide to cooperate with adjacent molds at said unloading and loading stations, means actuating said grippers simultaneously for an advanced position of said slide to unload a molded article and to position a base component in the adjacent mold between successive stepped advancing movements of said molds, and for a retracted position of said slide operating said grippers simultaneously to deposit said molded article and to pick up a base component, and means operating in each said recurring cycle to advance and retract said slide and to actuate said grippers in each of said advanced and retracted positions.

5. Apparatus for molding articles according to claim 4 in which molds are provided having removable covers with depressed plastic receiving top surfaces with sprue holes for the injection of plastic therethrough into said molds, a flash removal gripper is mounted on said slide for engagement with a mold at a flash removal station adjacent said unloading station and in which means is provided for operating said flash removal gripper simultaneously with said unloading and loading grippers for the advanced position of said slide to engage and remove flash from a mold at said flash removal station and for the retracted position of said slide to discharge said flash.

6. Apparatus for molding articles in molds having covers with sprue holes which comprises a platen formed with a flat surface having rectangularly arranged sides, and a series of said molds arranged contiguously along a first path along one of said sides, and along a plurality of adjacent parallel paths of opposite direction disposed across said surface, a forming device disposed at the receiving end of each of said plurality of paths forcing an uncured resilient material into said molds under pressure in a forming operation in a predetermined time interval, a heat applying curing device for the molds on said plurality of paths, mold unloading and loading devices located respectively at spaced mold unloading and loading stations along said first path, and means for effecting a cyclical step advance of said molds defining a closed cycle in which the time period required at each forming station is the time used in a cycle for each said unloading and loading operation in the single path multiplied by the number of said plurality of paths comprising means to effect a stepped advance of said molds along said first path moving each mold to a next succeeding unloading and loading station and ejecting a last mold in said first path, means for advancing said ejected mold to a predetermined position adjacent a selected forming station, means advancing said ejected mold into said selected forming station and its associated parallel path and ejecting a mold from the other end of said path, means for advancing said last ejected mold into said first path, and operating means operable during each said cycle actuating each of said unloading and loading devices, and actuating a said selected forming device releasing the pressure upon a preceding mold therein and applying pressure to the succeeding mold advanced into said selected forming device.

7. Apparatus for molding seals consisting of a reinforcing member and a resilient member bonded thereto in molds according to claim 6, in which unloading and loading stations are disposed along said first path for the movement of molds successively thereto in successive step cycles including a mold opening device, a seal unloading device, a reinforcing member positioning device, a mold closing device, and resilient material loading device, means are provided to heat said platen, and said curing device is a curing oven overlyng said plurality of adjacent paths across said surface.

References Cited by the Examiner

UNITED STATES PATENTS

| | | | |
|---|---|---|---|
| 426,479 | 4/90 | Tremaine | 18—4 |
| 1,009,355 | 11/11 | Turnbull | 107—58 |
| 1,674,387 | 6/28 | Campbell | 18—6 |
| 1,935,794 | 11/33 | Geyer | 264—297 |
| 1,948,344 | 2/34 | Fischer | 18—4 |
| 2,095,151 | 10/37 | O'Connor et al. | 214—16.15 XR |
| 2,251,135 | 7/41 | Iknayan et al. | |
| 2,386,034 | 10/45 | Church | 18—2 |
| 2,547,294 | 4/57 | Wahl | 25—2 XR |
| 2,563,866 | 8/51 | Puls | 107—58 |
| 2,576,519 | 11/51 | Kopp | 25—156 |
| 2,629,158 | 2/53 | Molla | 18—4 XR |
| 2,792,593 | 5/57 | Hardgrove | 18—4 |
| 2,828,508 | 4/58 | Labarre | 18—2 |
| 3,063,097 | 11/62 | Jutzi | 18—36 |

FOREIGN PATENTS 257,741  9/26  Great Britain.

WILLIAM J. STEPHENSON, *Primary Examiner.*

ALEXANDER H. BRODMERKEL, ROBERT F. WHITE, *Examiners.*

UNITED STATES PATENT OFFICE
CERTIFICATE OF CORRECTION

Patent No. 3,197,811                             August 3, 1965

Woodrow I. Workman

It is hereby certified that error appears in the above numbered patent requiring correction and that the said Letters Patent should read as corrected below.

Column 2, line 13, after "station" insert -- where the blank and resilient material are formed --.

Signed and sealed this 15th day of March 1966.

(SEAL)
Attest:

ERNEST W. SWIDER
Attesting Officer

EDWARD J. BRENNER
Commissioner of Patents